United States Patent Office 3,287,280
Patented Nov. 22, 1966

3,287,280
HYDRODESULFURIZATION CATALYST AND
PROCESS FOR PREPARING THE SAME
Joseph Dennis Colgan, Ozone Park, and Nicholas Chomitz, Yonkers, N.Y., assignor to American Cyanamid Company, Stamford, Conn., a corporation of Maine
No Drawing. Filed June 14, 1963, Ser. No. 287,799
4 Claims. (Cl. 252—435)

This invention relates to an improved nickel-molybdenum-alumina catalyst suitable for hydrodesulfurization and other hydrogenating reactions and to the method of manufacture of such improved catalyst.

Frequently, petroleum feed stocks contain sulfur compounds such as mercaptans, thiophenes and the like in minor amounts. Such compounds are known to be highly undesirable, particularly in gasolines to which tetraethyl lead is to be added, in that their presence requires the addition of substantially increased amounts of such an anti-knock compound. Hydrodesulfurization is the principal means by which sulful content of petroleum feed stocks are reduced and in this technique the organic sulfur compounds are reacted with hydrogen in the presence of a hydrogenation catalyst to convert the sulfur to hydrogen sulfide, which is more readily removed. Typically, such hydrogenation catalysts are cobalt oxide, molybdic oxide-alumina catalysts and nickel oxide-molybdic oxide alumina catalysts.

A principal mode of manufacture of such hydrogenation catalysts involves the impregnation of a suitable alumina carrier with a solution or with solutions of the materials such as the cobalt or nickel salts and molybdenum salts.

In producing impregnated catalysts, a principal difficulty has been in achieving uniform distribution of the promoters throughout a formed base material. This, to a substantial extent, is the result of the limited number of truly solubilizing or dispersing mediums for the known metal salt precursors of the promoter oxides. If more than a single impregnation is to be employed, the number of steps in the manufacturing procedure is increased, which generally increases the cost of the procedure and is generally less desirable than a successful single impregnation procedure.

Therefore, it is an object of the present invention to provide a novel process for preparing uniformly impregnated formed hydrogenation catalysts suitable for use in hydrodesulfurization and other hydrogenation reactions.

Another object of the present invention is to provide a novel single step impregnation procedure for preparing formed hydrogenation catalysts whereby uniform impregnation is readily and simply achieved.

It is a still further object of this invention to provide a single step impregnation procedure which not only insures uniform impregnation of a formed catalyst base material by the promoters or active materials, but in addition, through the presence of residual material from the impregnating aid, improves the stability of the final catalyst composition.

These and other objects and advantages of the present invention will become more apparent from the detailed description thereof set forth hereinbelow.

In accordance with the present invention, a process for preparing a hydrogenation catalyst is provided which comprises impregnating calcined formed alumina base or carrier material with a dilute phosphoric acid solution of molybdenum and nickel salts which are capable of being converted to their oxides upon calcination. The impregnating solution will contain sufficient phosphoric acid to solubilize the salts and to contain at least about .2 mole of acid per mole of molybdenum. In addition, the impregnating solution must contain sufficient molybdenum and nickel salts to impart from about 8 to about 20% of molybdenum expressed as its oxide and 1 to about 5% of nickel expressed as its oxide to the final catalyst composition. After impregnation, the alumina is calcined to convert the molybdenum and nickel salts to their oxides.

The alumina base or carrier material suitable for use in accordance with this invention is prepared by precipitation from a water solution of a water-soluble aluminum compound which may be either an aluminum salt such as aluminum sulfate, aluminum nitrate, aluminum chloride or the like, or an alkali metal aluminate such as sodium or potassium aluminate. Typically, such alumina may be prepared in accordance with description appearing in U.S.P. 2,980,632. Typically, according to the procedure set forth therein, an alumina precipitate is filtered and washed to reduce alkali metal and salt anions such as sulfate where present, to acceptable levels, i.e. below .02% for alkali metal and .5% for sulfate, and are thereafter spray dried. As in the case of the alumina described therein, it is preferred that the dried alumina contemplated for use in this invention be characterized by a surface area when calcined of at least 150 square meters per gram, a pore volume of at least .5 cc. per gram (usually from .5 to about 1) and an apparent bulk density (ABD) within the range of about .2 to about .6 gram per cc. prior to forming as by extrusion and impregnation.

Typically, formed unimpregnated catalyst particles such as extrudates will be characterized, after calcination, by a surface area of from about 200 to about 300 m.$^2$/gram, a pore volume of about .5 to about .9 cc./gram, and an ABD of from about .5 to .8 gram/cc. Typically, a final catalyst, i.e., a catalyst after impregnating and calcination of the impregnated base, will have a surface area of from 150 to about 275 m.$^2$/gram, a pore volume of from about .4 to .8 cc./gram, and an ABD of from about .5 to about .9 grams/cc.

By "calcined formed alumina base," as that and similar expressions are employed herein, it is meant base or carrier in one of a number of particulate forms in which the alumina is calcined. Preferably, such base is pelleted as by extruding or by means of pill forming devices and is typically prepared as a ⅛″, ¹⁄₁₆″ or ¹⁄₃₂″ diameter extrudate. The alumina in the base or carrier may be calcined prior to pelleting or may be calcined after pelleting, the important aspect is that the alumina base be formed and comprised of calcined alumina prior to impregnation.

By "alumina base material or carrier" as that and similar expressions are employed herein it is meant calcined formed substantially pure alumina or alumina containing minor amounts, as for example up to about 5% of such known stabilizers as silica. As will be seen more clearly hereinafter, stabilizers such as silica may be incorporated into the alumina base or carrier materials contemplated by this invention by the addition of synthetic silica-alumina hydrogel cracking catalyst precursor in hydrogel form to precipitated alumina contemplated for use in this invention.

The phosphoric acid solutions of the molybdenum and nickel salts are characterized by a number of important restrictions. Thus, the phosphoric acid must be present in the solution in an amount sufficient to solubilize the salts and to maintain their solubility over a substantial period of time so that uniform impregnation or dispersion of these metals as their salts may be achieved. In addition, phosphoric acid must not be present in the impregnating solution in an amount which upon calcination of the catalyst material will significantly adversely affect the activity and strength of the catalyst in use and upon repeated regeneration. For the most part, we have found that acceptable results in impregnation are achieved when the phosphoric acid solution contains at least about .2 mole of the phosphoric acid per mole of molybdenum present in the solution and normally the mole ratio will be from above about .2 to about .8 mole of phosphoric acid per mole of molybdenum. Uniformly good impregnations are achieved when the phosphoric acid to moybdenum mole ratio is about .4:1. The final catalyst may contain amounts as high as about 10% or even more of phosphoric acid residue after final calcination, but preferably will contain from about 1 to about 5% by weight of the catalyst as determined by phosphorous analysis.

The nickel and molybdenum promoters are employed in the phosphoric acid solution in the form of their salts which are capable of being converted to their oxides upon calcination. Typical of such salts are nickel nitrate hexahydrate and ammonium molybdate. The phosphoric acid solutions containing such salts will have sufficient molybdenum salt present to impart from between 8 and about 20% of molybdenum expressed as its oxide in the final catalyst composition, while the nickel salt will be present in an amount sufficient to provide from between about 1 to about 5% of nickel expressed as its oxide in the final catalyst composition.

After impregnation, the catalyst material is calcined normally at a temperature of from between about 800 to about 1300° F. to activate the catalyst and convert the salts to their corresponding oxides.

The use of phosphoric acid ($H_3PO_4$) in accordance with this invention has been demonstrated to be unique with respect to numerous other acidic materials. In addition to forming uniform and stable impregnating solutions, it confers additional benefits on the catalysts employing this process. It is believed that the use of phosphoric acid results in the deposition of meta-phosphoric acid on the catalyst support, since on drying and calcination phosphoric acid, that is, ortho-phosphoric acid ($H_3PO_4$) is converted to $HPO_3$ as described by Holt and Meyers in the Journal of the Chemical Society (London) 99, 390 (1911). As described in the article, meta-phosphoric acid is an insoluble form, and this has been demonstarted by our inability to remove it, even by refluxing in boiling water over a period of several hours. Further evidence that the $H_3PO_4$ residue in the calcined catalyst is $HPO_3$ was obtained by comparison of the weight of $HPO_3$ based on catalyst phosphorous analysis with the catalyst weight attributed to the $H_3PO_4$ residue. Close agreement between the two weights was obtained. In addition, the presence of meta-phosphoric acid on the catalyst material, when employed in proper amounts, appears to reinforce the catalyst support. While the use of increasing quantities of phosphoric acid ($H_3PO_4$), hereinafter simply referred to as phosphoric acid, in the impregnation solution can impart greater physical strength and stability to the final catalyst, large amounts of phosphoric acid residue tend to mask the promoters and thus reduce the activity of the catalyst. Accordingly, as noted above, care must be taken to avoid the use of excessive amounts of phosphoric acid in the impregnating solution. In general, amounts which result in the addition of above about 12% of $H_3PO_4$ to the catalyst particles adversely affect activity to an undesirable degree.

In order that the present invention will be more fully understood, the following examples are given primarily by way of illustration. No specific details or enumerations contained herein should be construed as limitations on the present invention except insofar as they appear in the appended claims. All parts and percentages are by weight unless otherwise specifically designated.

EXAMPLE 1

*Preparation of precipitated alumina powder*

To a turbine-agitated tank containing a water heel, separate streams of sodium aluminate (23% $Al_2O_3$) and aluminum sulfate-water (5.8% $Al_2O_3$) are simultaneously added. The quantities of alum, sodium, aluminate and water are controlled to produce a final slurry with an $Al_2O_3$ content of 7%. The rates of addition are controlled to maintain the tank pH at 7.5-8.0 and the temperature is regulated to approximately 95° F. Toward the end of the precipitation, the flow of sodium aluminate is continued to raise the pH to 10.0-10.5, at which pH the slurry is aged for ½ hour.

The aged slurry is then filtered on a vacuum filter and is washed with three displacements of water. The washed cake is repulped with additional water to a solids content of 7% and the pH is adjusted to 7.0 with nitric acid. The adjusted slurry is aged for about ½ hour, dewatered and washed.

The washed cake is then spray dried with a gas outlet temperature of 275° F. to produce a powder with an $Al_2O_3$ content of approximately 75% and an ABD of approximately 0.32 gram per cc. The spray drying may be accomplished within a suitable syray dryer such as that described in U.S. Patent No. 2,644,516, dated July 7, 1953.

To prepare a silica stabilized alumina carrier or base material, as for example one containing 5% $SiO_2$, a washed filter cake of the type described above immediately prior to spray drying is intimately mixed with a cracking catalyst hydrogel slurry produced as described in U.S. Patent No. 2,859,184. In this procedure, the cracking catalyst slurry at approximately 8% solids with a solid $Al_2O_3/SiO_2$ ratio of 25/75 and the ratio of the cracking catalyst to the precipitated alumina slurry is so regulated as to produce an $SiO_2$ solids content of 5%. After intimate mixing of the two slurries, spray drying is carried out as described above.

In preparing extrudates for impregnation, the spray dried powder is mixed with undried slurry and water to form a paste which is extruded through a die plate to produce extrudates of the desired diameter. The wet extrudates are cut to the desired length, dried in a conveyor drier with circulating air at 250° F. and then calcined in a rotary kiln at 1300° F.

The preparation of a typical extrusion mix involves the employment of 500 lbs. of spray dried powder and 850 lbs. of slurry which are mulled for an hour prior to extrusion.

EXAMPLE 2

The calcined ¹⁄₁₆″ diameter extrudates are charged to a baffled drum which is slowly rotated while a nickel nitrate-hexahydrate-ammonium molybdate containing solution is sprayed on the tumbling bed of extrudates. The nickel and molybdenum content of the solution is controlled to produce the desired nickel oxide and molybdenum oxide content in the final product and the solution volume is adjusted to completely saturate the extrudate charge. The wet impregnated extrudates are tumbled for 5 to 20 minutes, discharged from the impregnator, dried in a conveyor drier at 250° F. and then calcined in a rotary kiln at 900° F. A typical impregnation operation involves the charging of 300 lbs. of calcined extrudates having a pore volume of 0.70 cc. per gram to the impregnator and impregnating with a solution prepared by adding 20.8 lbs. of 85% $H_3PO_4$ to 196 lbs. of 28% $MoO_3$ ammonium molybdate solution, mixing and then adding 77 lbs. of 17.4% nickel oxide as nickel nitrate hexahydrate solution.

During the impregnation, care is taken to obtain an even distribution of the impregnating liquor spray.

The final catalyst contains approximately 14.5% molybdenum oxide, 3.5% nickel oxide, 3.8% $HPO_3$ (phosphoric acid residue) and the balance alumina.

The volume activity of this catalyst was determined, as was that of a standard ¹⁄₁₆″ extrudate, for sulfur and nitrogen removal, in accordance with the test procedure outlined in Example 6. The standard was of substantially the same composition as the catalyst of this example except that phosphoric acid was not employed during impregnation and thus the final catalyst was free of phosphoric acid residue. In the case of the standard, impregnation was accomplished by employing aqueous solutions of ammonium molybdate and nickel nitrate hexahydrate. The results of this comparison are set forth below and demonstrate the superior activity of the catalyst of this invention.

| Catalyst | Activity | |
|---|---|---|
| | Sulfur Removal | Nitrogen Removal |
| Example 2 | 127 | 149 |
| Standard | 100 | 100 |

EXAMPLE 3

The effects of solution impregnation procedure and phosphoric acid content are demonstrated hereinbelow. The following three solutions were prepared:

(a) A solution with an $MoO_3$ content of approximately 30.5% $MoO_3$ was prepared by mixing with heat and vigorous agitation one part of ammonium molybdate $$[(NH_4)_6Mo_7O_{24}-4H_2O]$$

with 1.53 parts of water. The final solution had a specific gravity of approximately 1.36.

(b) A second solution with an NiO content of approximately 10.2% NiO was prepared by dissolving one part of nickel nitrate hexahydrate $[Ni(No_3)_2 \cdot 6H_2O]$ in 1.44 parts of water produced a final solution having a specific gravity of 1.25.

(c) A series of solutions were prepared by mixing 85% $H_3PO_4$ with 14 cc. of a solution described in (a) after which 9 cc. of a solution described in (b) was added slowly with agitation. The quantity of acid added to solution (a) was varied as shown by the data in Table I below.

Observations on the stability of the solutions identified in Table I are reported in Table II below for both initially and after 64 hours of standing.

TABLE I

| No. | Cc. of Acid | Moles of $H_3PO_4$ | Mole Ratio | |
|---|---|---|---|---|
| | | | $H_3PO_4/Ni$ | $H_3PO_4/Mo$ |
| 1 | 0.25 | .0037 | .24 | .092 |
| 2 | 1.00 | .0146 | .95 | .36 |

TABLE II

| No. | Observations | |
|---|---|---|
| | On Addition of Ni to Mo Acid | After 64 hours |
| 1 | Precipitate formed rapidly | Large volume of precipitate present in a yellow-green solution. |
| 2 | Hazy solution formed | Small volume of precipitate present in a green solution. |

Table II above taken in combination with Table I demonstrates that when the mole ratio of phosphoric acid to molybdenum approaches .36 a stable solution results.

EXAMPLE 4

Solutions were formed by mixing $H_3PO_4$ with 9 cc. of the nickel solution described in (b) above, after which 14 cc. of the molybdenum solution described in (a) above were added slowly with agitation. The quantity of acid added to the nickel solution was varied as shown by the data in Table III below.

TABLE III

| No. | Cc. of Acid | Mole Ratio | |
|---|---|---|---|
| | | $H_3PO_4/Ni$ | $H_3PO_4/Mo$ |
| 3 | 0.25 | 0.24 | .092 |
| 4 | 0.50 | 0.48 | .181 |
| 5 | 0.75 | 0.72 | .273 |
| 6 | 1.00 | 0.95 | .362 |

The stability of these solutions, both initially and on standing, are recorded in Table IV hereinbelow.

TABLE IV

| No. | On Addition of Mo to the Mo-Acid Solution | On Standing |
|---|---|---|
| 3 | Hazy after about 2 minutes | Precipitate observed after 5 min., solution yellow-green. |
| 4 | Clear green solution | Hazy after 24 hours with precipitate gradually forming. |
| 5 | ---do--- | Clear after 24 hours, hazy after 48 hours with precipitate gradually forming. |
| 6 | ---do--- | Solution clear after 64 hours. |

Table IV demonstrates that stable solutions are formed both initially and upon standing when the acid to nickel ratio is above about .5 and acid to molybdenum ratio is above about .2.

Examples 3 and 4 demonstrate that the phosphoric acid may be added to either the molybdenum or the nickel solution, although the addition of the acid to the nickel solution is demonstrated to be preferred. Compare solution 2 with solution 6.

EXAMPLE 5

To demonstrate the uniqueness of phosphoric acid to form stable solutions of nickel and molybdenum salts, a number of other acids were investigated.

These included citric acid, acetic acid, tartaric acid, glycolic acid, oxalic acid and urea. Although some measure of sability was obtained with some of these acids, such as oxalic and tartaric acid, it was determined that a high concentration of acid was required and uniformity of impregnation unacceptable. Tartaric acid solutions precipitated when an attempt was made to employ them in impregnation procedure. This was demonstrated by the tendency for the wet impregnated extrudates to become gummy and agglomerate as well as the determination of low promoter content on the calcined extrudates. As noted, oxalic acid produced a stable solution of nickel and molybdenum salt, but the extrudates were cored (characterized by large unimpregnated centers) demonstrating a non-uniform impregnation.

EXAMPLE 6

In order to demonstrate the adverse effects of high acid concentrations in the impregnating solutions on catalyst properties, a series of catalysts (6A–6C) were prepared in which the phosphoric acid content and the corresponding residue (metaphosphoric acid) was varied over a relatively wide range.

The volume activity of these catalysts was determined by charging a test reactor with a measured volume of the catalyst pellets and a West Texas gas oil containing 1.16% of sulfur and 0.1% nitrogen added as 3-methyl-quinaldine was passed through in admixture with 2500 cubic feet of hydrogen per barrel of feedstock. The velocity of the oil vapor through the catalyst and a temperature 705° F. and reaction pressure 750 p.s.i.g. are measured. A sample of the product is collected and analyzed for sulfur and nitrogen. The percent of sulfur and nitrogen removed by this procedure at space velocities of 5 and 10 volumes of feed per volume of catalyst per hour is compared with that produced with a catalyst used as a standard. The catalyst standard in this case was the same as that reported in Example 2, gave a sulfur removal of about 100 and was a 1/16" extrudate.

The catalysts employed in the comparison were prepared as follows:

6A–6C

Three hundred grams of 1/16"-diameter, calcined extrudates were charged to a baffled, slowly rotating drum and then a nickel nitrate hexahydrate-ammonium molybdate containing solution was sprayed on the tumbling bed of extrudates. The nickel and molybdenum content of the solution was controlled to produce approximately 3.2% nickel oxide and 15% MoO$_3$ in the final product and the solution volume was adjusted to 279 cc.—sufficient to saturate the extrudates. The wet impregnated extrudates were tumbled for 5 minutes, removed from the impregnator, dried in an air-circulating oven at 250° F. and then calcined in a laboratory muffle at 900° F.

The impregnating solution for 6A was prepared by mixing 19 grams of 85% H$_3$PO$_4$ with 64 grams of a nickel nitrate hexahydrate-water solution containing 15.1% Ni and then adding with continued mixing a solution of 70.0 grams of ammonium molybdate in 150 cc. of water. The solution was then adjusted with water to a volume of 279 cc.

The impregnating solutions for samples 6B and 6C were prepared in the same manner and from the same materials as the solution for sample 6A, but the quantities were changed. For sample 6B, the impregnation solution was prepared from 71.3 grams of 15.1% nickel nitrate solution, 62.3 grams of 85% H$_3$PO$_4$ and a solution of 81.3 grams of ammonium molybdate in 170 cc. of water. For sample 6C, the impregnating solution was prepared from 80.8 grams of 15.1% nickel nitrate solution, 118 grams of 85% H$_3$PO$_4$ and a solution of 91.9 grams of ammonium molybdate in 140 cc. of water.

The results of this comparison are set forth in Table V below.

Table V above demonstrates that in addition to increasing the strength and stability by increasing the phosphoric acid content during impregnation and phosphoric acid residue in the final catalyst to amounts greater than 10% that such increases also adversely affect activity as measured by both sulfur and nitrogen removal.

It should further be noted that similar catalysts to those described above are normally characterized by poor thermal stability, which in part at least is attributed to the effect of the molybdenum oxide component. Thus, catalysts prepared from the same base material as in catalysts 6A–6C and otherwise having the same composition, however not impregnated employing phosphoric acid, lose over 100 square meters in surface area on steaming at 705° C. The retention of strength after thermal treatment at 800° C. is also unexpected and is attributed to the residue from the phosphoric acid impregnation.

EXAMPLE 7

Additional phosphoric acid stabilized impregnating solutions were prepared as indicated below in Table VI employing nickel nitrate hexahydrate and ammonium molybdate as the source of nickel oxide and molybdic oxide, respectively.

TABLE VI

| Solution No. | H$_3$PO$_4$/MoO$_3$ Mole Ratio | H$_3$PO$_4$/NiO Mole Ratio | MoO$_3$ Concentration, gms./cc. | NiO Concentration, gms./cc. | Observations |
|---|---|---|---|---|---|
| 1 | 0 | 0 | .28 | .055 | Considerable precipitation in 9 minutes. |
| 2 | .09 | .24 | .28 | .056 | Clear yellow-green solution, precipitate forming after 2 minutes. |
| 3 | .18 | .47 | .28 | .055 | Clear green solution, slight yellow-green, precipitate forming after 15½ minutes. |
| 4 | .28 | .94 | .23 | .035 | Clear green solution, slight yellow-green, turbidity developing after 186 minutes. |
| 5 | .36 | 1.25 | .30 | .045 | Clear green solution, very slight yellow-green, very slight turbidity after 24 hrs. |
| 6 | .36 | .94 | .27 | .054 | Do. |
| 7 | .36 | .68 | .20 | .056 | Clear green solution. |
| 8 | .36 | .94 | .37 | .075 | Solution green, slightly turbid. |
| 9 | .72 | 1.88 | .35 | .070 | Clear green solution. |
| 10 | .48 | 1.88 | .29 | .039 | Do. |
| 11 | .54 | 1.41 | .25 | .050 | Do. |
| 12 | .55 | 1.76 | .22 | .035 | Do. |
| 13 | .73 | 1.35 | .19 | .054 | Do. |
| 14 | .73 | 1.88 | .25 | .050 | Do. |
| 15 | .73 | 1.25 | .22 | .067 | Do. |

Table VI above demonstrates that sufficient acid must be added to complex the ammonium molydate and that increases in ammonium molydate concentration require increases in the acid to molybdate mole ratio.

It has been determined that for a hydrogenation catalyst of the type contemplated by this invention containing 15% molybdic oxide, 3% nickel oxide, 5% silica, phosphoric acid residue and the balance alumina that from above about .3 to .4 mole of phosphoric acid per mole of molybdenum oxide should be employed during impregnation. Lower mole ratio of phosphoric acid to molybdenum may be used for impregnation of a support with high porosity, since a more dilute solution is required to saturate the pores. Excellent stability has been obtained with acid to molybdic oxide ratio of from .4 to .7,

TABLE V

| Catalyst No. | Catalyst Calcined at 900° F. | | Activity | | Steamed 17 Hrs. at 705° C. | | Treated 2 Hrs. at 800° C. | |
|---|---|---|---|---|---|---|---|---|
| | HPO$_3$ Content, percent | Crush strength per unit of length, lbs./in.[2] | Sulfur removal | Nitrogen removal | Surface area decrease,[1] m$^2$/g. of base | Bulk crush strength at 200 p.s.i., percent −16 mesh fines[3] | Crush strength per unit of length, lbs./in. | Surface area decrease,[1] m$^2$/g. of base |
| 6A | 3.16 | 101 | 122 | 154 | 91 | 17.4 | 26 | 106 |
| 6B | 10.0 | 141 | 107 | 154 | 88 | 8.7 | 29 | 112 |
| 6C | 16.8 | 152 | 90 | 107 | 79 | 5.9 | 48 | 95 |
| X[1] | 0 | | | | 151 | | | |

[1] 15% MoO$_3$, 3% NiO, 5% SiO$_2$, balance Al$_2$O$_3$. (No H$_3$PO$_4$ impregnating aid.)
[2] In this test, a sample of extrudates with length in a narrow range (in this example length=1.6 to 2.2 × diameter) are selected. For each extrudate the length and the side force required to crush it between two flat parallel plates are determined. The crush strength as pounds of force per unit of length was then obtained by dividing the average crushing force by the average length.
[3] In this test 10 grams of extrudates from which fines have been removed are charged to a cylinder which is open at one end and has a cross sectional area of 1 square inch. A piston is then inserted in the open end and a force of 200 pounds is applied for 5 minutes, after which the extrudates are removed and the −16 mesh fraction is measured and reported as a percent of the total charge.

even in concentrated solutions such that impregnation of supports with porosity as low as .52 cc. per gram is shown to be possible.

We claim:

1. A method of preparing a catalyst comprising impregnating a calcined formed alumina base with a phosphoric acid solution of molybdenum and nickel salts capable of being converted to their oxides upon calcination, said impregnation solution containing sufficient acid to solubilize the salts and to contain at least about .2 mole of acid per mole of molybdenum but insufficient to add more than 10% phosphoric aicd residues to the final catalyst composition, said impregnating solution containing sufficient molybdenum and nickel salt to impart from 8 to about 20% of molybdenum as the oxide and 1 to about 5% of nickel as its oxide, and thereafter calcining the impregnated alumina to convert the molybdenum and nickel salts to their oxides.

2. A method of preparing a catalyst comprising impregnating calcined alumina extrudate base with a phosphoric aicd solution of molybdenum and nickel salts capable of being converted to their oxides upon calcination, said impregnation solution containing from about .2 mole to .8 mole of acid per mole of molybdenum, said impregnating solution containing sufficient molybdenum and nickel salt to impart from 8 to about 20% of molybdenum as its oxide and 1 to about 5% of nickel as its oxide, and thereafter calcining the impregnated alumina extrudates to convert the molybdenum and nickel salts to their oxides.

3. A method of preparing a catalyst comprising impregnating a calcined alumina extrudate base formed from precipitated alumina with a phosphoric acid solution of ammonium molybdate and nickel nitrate hexahydrate, said impregating solution containing from about .2 mole to about .8 mole of acid per mole of nickel, said impregnating solution containing sufficient molybdenum and nickel salt to impart from 8 to about 20% of molybdenum as its oxide and 1 to 5% of nickel as its oxide to said extrudates, and thereafter calcining the impregnated alumina extrudates to convert the molybdenum and nickel salts to their oxides.

4. A method of preparing a catalyst comprising impregnating calcined alumina extrudates formed from precipitated alumina and having an apparent bulk density of from .5 to .8 grams/cc., with a phosphoric acid solution of ammonium molybdate and nickel nitrate hexahydrate, said impregnating solution containing from about .2 mole to about .8 mole of acid per mole of nickel, said impregnating solution containing sufficient molybdenum and nickel salt to impart from 8 to about 20% of molybdenum as its oxide and 1 to 5% of nickel as its oxide to said extrudates, and thereafter calcining the impregnated alumina extrudates to convert the molybdenum and nickel salts to their oxides.

References Cited by the Examiner
UNITED STATES PATENTS

| | | | |
|---|---|---|---|
| 2,060,871 | 11/1936 | Ipatieff | 252—435 |
| 2,496,621 | 2/1950 | Deery | 252—437 |
| 2,625,519 | 1/1953 | Hartig | 252—437 |
| 2,687,370 | 8/1954 | Hendrick | 208—217 |
| 2,748,090 | 5/1956 | Watkins | 252—437 |
| 2,905,625 | 9/1959 | Berger | 208—89 |
| 2,938,002 | 5/1960 | Kieth et al. | 252—465 |
| 3,232,887 | 2/1966 | Pessimisis | 252—435 |

OTHER REFERENCES

McKinley: "The Hydrodesulfurization of Liquid Petroleum Fractions," Catalysis, Emmett, Reinhold Publishing Co., New York (1957), vol. (V), page 457.

OSCAR R. VERTIZ, *Primary Examiner.*

MAURICE A. BRINDISI, BENJAMIN HENKIN, *Examiners.*

R. M. DAVIDSON, A. J. GREIF, *Assistant Examiners.*